United States Patent Office 3,473,849
Patented Oct. 21, 1969

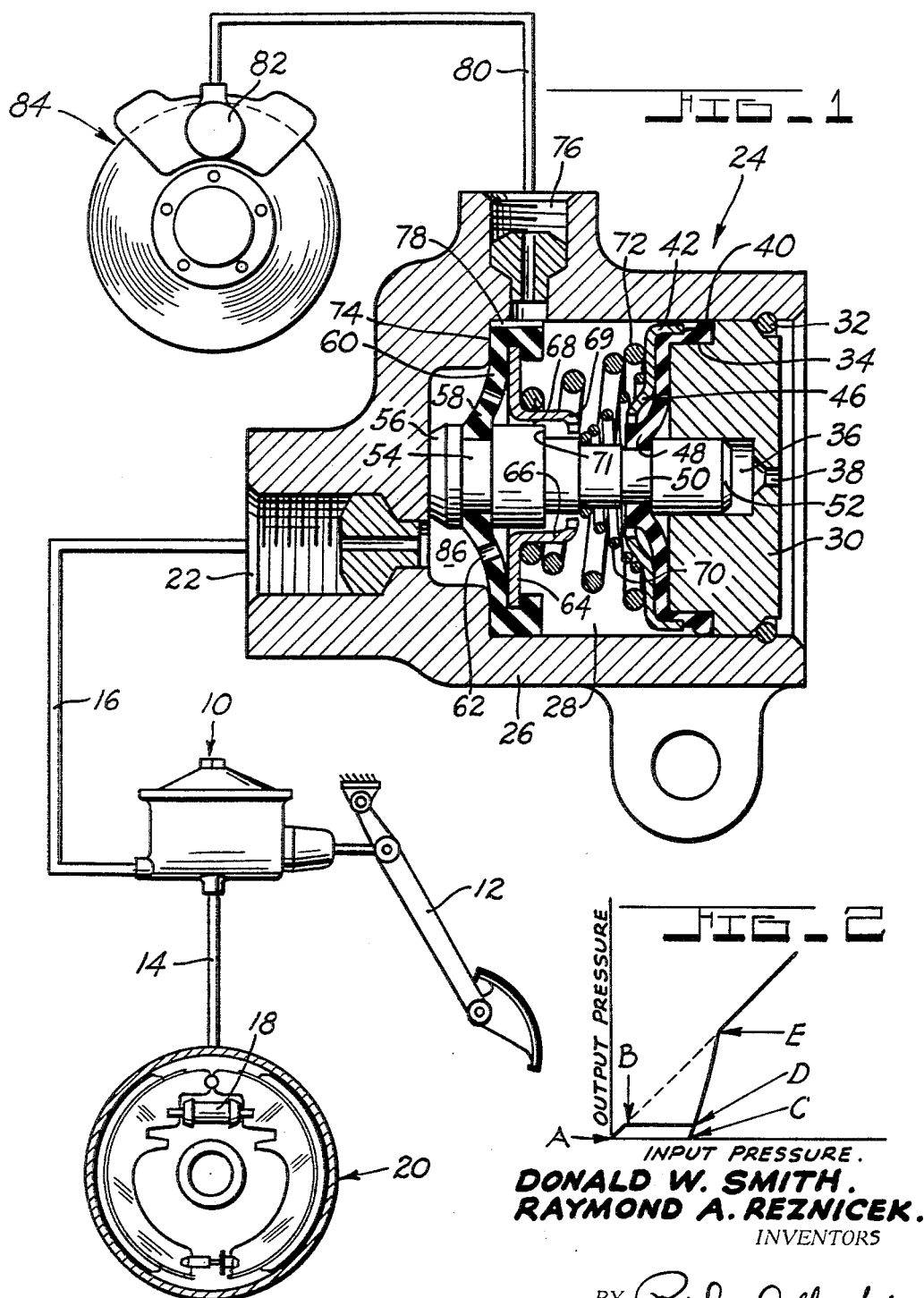

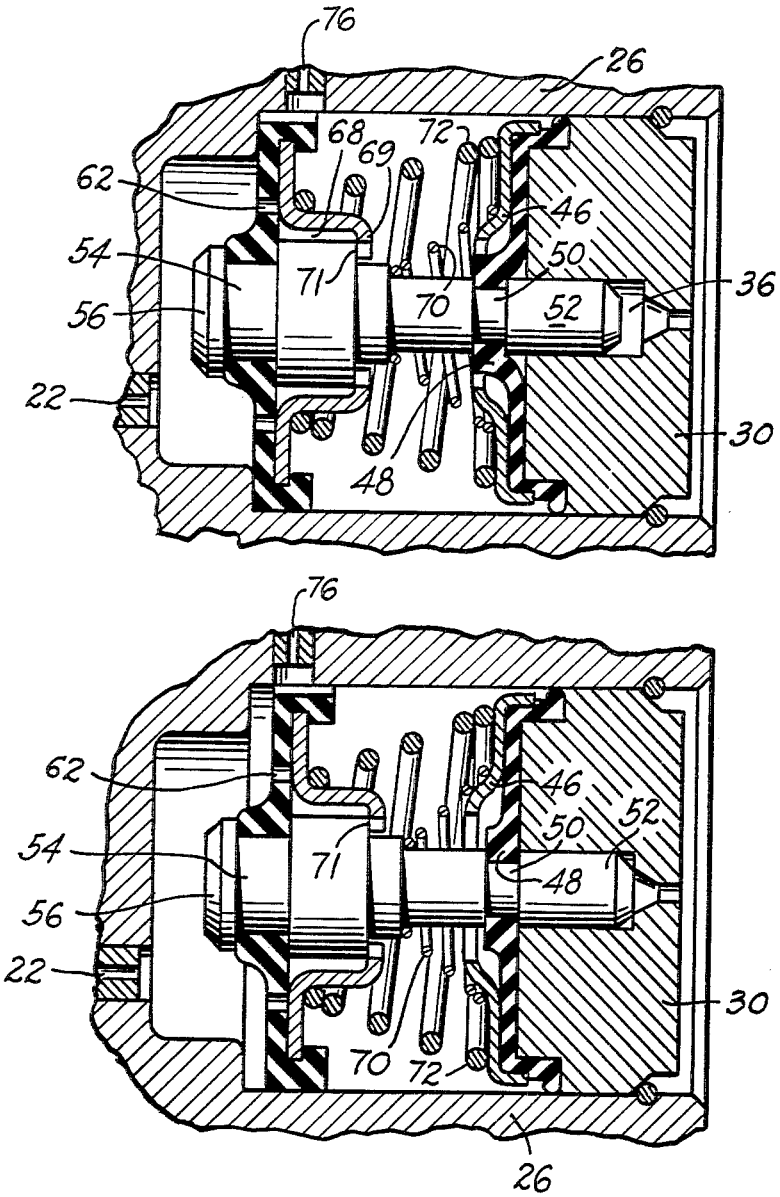

3,473,849
PRESSURE HOLD-OFF VALVE
Donald W. Smith and Raymond A. Reznicek, St. Joseph, Mich., assignors to The Bendix Corporation, a corporation of Delaware
Filed Mar. 13, 1967, Ser. No. 622,560
Int. Cl. B60t 13/00
U.S. Cl. 303—6                                   12 Claims

ABSTRACT OF THE DISCLOSURE

A fluid pressure valve for regulating delivery of motive fluid which has pressure responsive valve means arranged to permit free flow up to a predetermined fluid pressure, a termination of flow until a higher pressure is reached and free flow again at pressures above the higher pressure including a vented diaphragm valve.

SUMMARY

The pressure hold-off valve in accordance with this invention is especially designed for a brake system of an automotive vehicle which includes a pair of front disc brake assemblies and a pair of rear drum brake assemblies. In such a brake system it may be readily realized by those skilled in the art to which this invention relates, the initial actuation pressure required for the application of the disc brake assemblies is substantially less than that required for initial actuation of the drum brake assemblies. This is due primarily to the return spring interconnecting the shoes of the drum brakes which must be overcome during an initial brake application. Therefore, only slight pressure is required to apply the disc brakes while a sizeable pressure is required to overcome the return springs on the drum brakes before the brake shoes engage the brake drums.

This invention provides a brake system with a pressure hold-off valve capable of communicating a limited pressure to the disc brakes at first and thereafter terminating the delivery of fluid pressure to the disc brakes until a predetermined pressure is realized whereupon a valve will control fluid communication to the disc brakes. In addition, the invention will permit rapid release of fluid pressure within the braking systems upon the release of the brake pedal controlling the brake actuator in a manner not heretofore deemed permissible by the prior art, and has as a related advantage in the elimination of seal friction which had in prior art designs a tendency to delay the release of braking pressure through the pressure hold-off valve.

RELATED PATENTS

This patent application is related to patent application Ser. No. 557,142 filed June 13, 1966 and assigned to the common assignee of this application, and is a patentably distinct improvement thereof.

DRAWING DESCRIPTION

FIGURE 1 of the drawing shows a pressure hold-off valve in cross section in a schematically illustrated braking system such as are being employed in present day automobiles;

FIGURE 2 is a graphical relationship of input to output pressure of a braking system employing this invention;

FIGURE 3 is a partial cross section of the hold-off valve of FIGURE 1 in its first stage of operation; and FIGURE 4 is a partial cross section of the hold-off valve of FIGURE 1 in its fully open position.

DETAILED DESCRIPTION

Although it should be recognized by those skilled in the art to which this invention relates that it has many applications other than in the braking systems of automobiles, for example, in an industrial application where the control of hydraulic pressures from a single actuator requires action by one and delayed action by the other.

In any event, the invention is deemed to be illustrated in a preferred embodiment with regard to the braking system of an automobile which employs a master cylinder 10 actuated by a brake pedal 12 to provide separate hydraulic pressures to conduits 14 and 16. As seen, conduit 14 leads directly to a wheel cylinder 18 of a vehicle's drum brake 20 such as may be expected to be utilized at the rear wheels of the vehicle.

Conduit 16 on the other hand leads to an inlet port 22 of a pressure hold-off valve 24 shown to have a case housing 26 with a stepped bore 28 that is closed by means of a plug 30 at one end. As may be appreciated by those skilled in the art, once again, the housing 26 may be cast to have an axial bore closed at respective ends by a pair of plugs rather than by the method illustrated and described.

The plug 30 is held by means of a snap ring 32 to the housing 26. It is formed with a recessed portion 34 and an axial bore 36 having an atmospheric vent 38. A rubber diaphragm having a peripheral beaded portion 40 is stretched over the recess 34 of the plug, and upon assembly of the plug to the housing 26 the beaded portion 40 forms a seal for the bore 28 about the plug. The diaphragm is held to the recess by an attaching member 42 which is formed to have an upset portion 46 adjacent the inner portion of the diaphragm about an inner bead 48 so that this portion of the diaphragm and the bead 48 may move relative to the plug 30.

The bead 48 is snap fitted into a groove 50 of a pressure responsive valve stem 52 slidably guided by the bore 36 of the plug 30. Another groove 54 is provided in the valve stem 52 spaced forwardly of the groove 50 and behind a head 56 of the stem 52. Within this groove a bead 58 of a valve diaphragm 60 is snap fitted. The valve diaphragm 60 is provided with a plurality of vents or passages, as they may be termed, 62 adjacent the bead 58. The diaphragm valve is reinforced by a member 64 having a flat radial face and a tubular body 66 which prescribes a passage 68 between it and the stem 52 which is open to the passages 62 through the diaphragm 60 so long as it is in the attitude shown. The body 66 terminates in a notched flange 69 abutting a shoulder 71. In assembling the stem 52 within the housing the notched flange 69 will relieve the loading from the diaphragms. It will also permit pressure actuation of diaphragm 60 and stem 52 without unduly stressing the diaphragm 60.

For maintaining the attitude of the diaphragm 60 and the valve stem 52, as shown, a pair of springs 70 and 72 are assembled within the bore 28 in a preloaded attitude between the member 42 and the member 64 and between the member 42 and the valve stem 52. It is possible to eliminate spring 70 by molding the portion of the diaphragm about bead 48 to act as a resilient means between plug 30 and stem 52.

The step design of the bore 28 provides a shoulder 74 upon which the diaphragm 60 is urged by the spring 72 to act as a valve seat between the inlet port 22 and an outlet port 76. In order that fluid may flow from the inlet port 22 about the diaphragm valve 60 and out the outlet port 66 whenever the pressure has removed the diaphragm 60 from the valve seat 74, a plurality of notches 78 are formed in the peripheral bead of the diaphragm 60 which is reinforced by the member 64.

Finally with regard to the description of the drawing, the outlet port 76 is connected by means of a conduit 80 to a disc brake actuator 82 for the front disc brakes 84 of the vehicle.

OPERATION

In operation, the operator of the vehicle will depress the brake pedal 12 to immediately provide separate hydraulic pressures for the conduits 14 and 16. At first, this hydraulic pressure will activate the motor 18 to begin to place the brake shoes or the rear wheel brakes 20 in engagement with the drums thereof. Also the brake pressure being fed through the conduit 16 to the inlet port 22 will pass into an inlet chamber 86 of the valve 24. From the inlet chamber 86, during this initial pressure from the master cylinder 10, it will flow via the passages 62 in the diaphragm 60 through the passage 68 between the member 66 and the stem 52 to the outlet port 76 to actuate the motor 82 to place the braking pads in like engagement with the rotor of the disc brake structure 84. The pressure flowing via the passage 68 to the outlet 76 will enter the control chamber portion of the bore 28 to act upon the movable section of the sealing diaphragm to cause the stem 52 to be retracted into the bore 36 (see FIGURE 3). As the stem is being retracted it will bring the passages 62 against the radially flat face of the member 64 to terminate communication of the inlet chamber to the outlet port 76 by overcoming the effect of spring 70. Thereafter, as the braking pressure develops to a point where the brake shoes of the wheel cylinder 18 can overcome the shoe return springs to engage the rear wheel brakes 20 before it will be sufficient over the area of the diaphragm 60 and valve stem 52 to disengage the diaphragm valve 60 from the valve seat 74.

After this pressure has been reached, there is free flow from the inlet port 22 to the outlet port 76 about the periphery of the diaphragm via the notches 78 or similar provisions as may be deemed appropriate in the peripheral portions of the diaphragm 60 (see FIGURE 4).

The valve 24 is flow sensitive so that on moderate applications the valve 52 will immediately move to close vents 62 with no measurable pressure being supplied to brake motor 82; i.e., flow through passage 68 is terminated by diaphragm approaching the face of plug 30 to reduce immediately its effective area around bead 48.

In any application the force acting on diaphragm valve 60 for closing of vents 62 is a function of the area of the diaphragm valve 60 and stem 52 as related to the effective area of diaphragm 40, as it rolls onto plug 30 adjacent bore 36. It should be appreciated that the effective area of diaphragm 60 is that between valve seat or shoulder 74.

Thus, and with reference to FIGURE 2, the valve 24 will function to permit a slight pressure supply to point B and hold-off thereafter until inlet pressure reaches point D. With regard to the moderate application referenced, pressure would be held off until inlet pressure reaches point C. Thereafter, and as valve seat 74 is being uncovered, the pressure relationship of the effective area of diaphragm 60 with the area of the movable portion of the rear diaphragm about bead 48 taking into consideration the loads of springs 70 and 72, will produce an outlet pressure characteristic as shown between points C, D and E of FIGURE 2.

At point E, the pressure between the diaphragms is such that it is effective on the rear diaphragm about bead 48 to force this area flush onto plug 30 to retract diaphragm valve 60 from seat 74, as seen in FIGURE 4, and the pressure relationship returns to the 45° slope.

Upon the termination of the braking action by the release of the brake pedal 12, the fluid pressure in the inlet chamber 86 will be immediately reduced so that the pressure within the disc brake motor 82 will act through the passage 68 on the diaphragm 60 to displace the inner portion thereof and thereby open the passages 62 therethrough to permit immediate communication of the motor 82 to the conduit 16.

Having fully described an operative construction of our invention, it is now desired to set forth the extent of coverage sought by these Letters Patent in the following claims.

We claim:
1. A hydraulic pressure hold-off valve comprising:
   a housing having a bore, an inlet port and an outlet port in spaced relation leading to and from, respectively, said bore of said housing, said housing having a valve seating surface about said inlet port;
   a resilient means in said bore of said housing having a flexible valve portion provided with vents therein and a flexible pressure responsive sealing portion;
   a valve stem operatively connected to said resilient means to space said valve portion between said inlet port and said outlet port and from said pressure responsive sealing portion, said valve stem normally positioning a first section of said valve portion on said seating surface while holding a second section of said valve portion such that said vents communicate said inlet port to said outlet port; and
   an end closure for said bore of said housing which end closure cooperates with said sealing portion to seal said bore upon being joined with said housing, said end closure having means to operatively support said stem within said bore.

2. A valve according to claim 1 wherein said resilient means is further characterized as including a reinforcing means connected to said flexible valve portion which reinforcing means has a radial face with a tubular body prescribing a fluid passage between it and said stem; and first and second springs respectively connected between said radial face and said end closure and said stem and said end closure to normally close said valve seating surface and open said fluid passage.

3. A valve according to claim 2 wherein said flexible valve portion is a vented diaphragm and said sealing portion is another diaphragm with both said vented diaphragm and said another diaphragm having annular beads about central openings which fit within spaced grooves about said valve stem.

4. A valve according to claim 3 wherein said another diaphragm has a supporting means thereover holding it to said end closure, which supporting means permits movement of the inner area of said another diaphragm adjacent its operative connection with said stem.

5. A valve according to claim 2 wherein said first spring and said second spring are nested within said bore and operatively connect said sealing portion to said end closure.

6. A hydraulic valve for controlling delivery of hydraulic pressure between an actuator and a fluid motor, said valve comprising:
   a housing having a stepped bore open at least at one end with inlet and outlet ports open to said bore, said housing having a valve seat between said ports;
   an end closure means for said bore including a plug removably connected to said housing which plug has a peripheral recess and an axial bore;
   a valve stem slidably guided by the axial bore of said plug within the stepped bore of said housing, said stem having spaced grooves;
   a first diaphragm having a peripheral bead within the recess of said plug sealing the connection of said plug with said housing to form a stepped chamber in said housing, said first diaphragm having a resiliently biased inner bead about an axial opening fitted within one of the grooves of said stem;
   attaching means fitted over said first diaphragm to immobilize the peripheral portion of same to said plug while permitting movement of the radially inner portion of said first diaphragm adjacent said inner bead;
   a flexible valve attached to the other groove of said stem and including a radially projecting member having vent openings therethrough, which member is adapted to be slidably related to the walls of said housing, said flexible valve including a reinforcing member therebehind having a tubular body about said stem and a face operatively related to said reinforcing member to control fluid communication from said vent openings to a passage between the tubular body and said stem; and means to bias said flexible valve onto said valve seat and to bias said stem to hold said vent openings open.

7. A hydraulic valve according to claim 6 wherein said plug has a vent to atmosphere leading to said bore behind the stem slidably guided therein.

8. A hydraulic valve according to claim 6 wherein said means to bias includes a first spring between said attaching means and said reinforcing member and a second spring between said attaching means and said stem.

9. A hydraulic valve according to claim 8 wherein said first and second springs are nested.

10. A hydraulic pressure delivery valve having a valve chamber closed by a plug within a housing having a valve seat between inlet and outlet ports and within which a sealing diaphragm is responsive to pressure in said chamber and connected to a valve stem to control a valve means to schedule, terminate, and reschedule hydraulic flow from an actuator to a motor and permit return flow upon release of pressure from said actuator characterized by improvements in said valve means comprising:

a flexible diaphragm having an inner bead affixed to said valve stem spaced from the sealing diaphragm and an outer bead operatively connected to the wall of said chamber such that a first passage is prescribed thereabout and said outer bead is slidably supported by the wall to cooperate with the valve seat between inlet and outlet ports of the housing, said flexible diaphragm having axially extending second passages therethrough;

an inflexible member reinforcing said outer bead and underlying said second passages through said diaphragm, said member having third passages therethrough radially displaced from the second passages through said flexible diaphragm and an operative connection with said stem to relieve assembly and pressure loads on said flexible diaphragm; and means to bias said stem and said inflexible member to normally maintain said flexible diaphragm on said valve seat and said second passages therethrough open to said third passages between said inflexible member and said stem, which bias means can be overcome by pressure in said valve chamber on the sealing diaphragm to close said second passages by abutting the flexible diaphragm and the member and thereafter allowing pressure at the inlet port to in assistance with pressure in the chamber regulate the seating of the flexible diaphragm on the valve seat in opposition to said bias means.

11. The structure of claim 10 wherein said means to bias is inclusive of a first spring between said plug and said inflexible member and a second spring between said plug and said valve stem.

12. The structure of claim 11 wherein said first and second springs are nested.

References Cited

UNITED STATES PATENTS

| | | |
|---|---|---|
| 3,245,726 | 4/1966 | Stelzer. |
| 3,278,241 | 10/1966 | Stelzer. |
| 3,375,852 | 4/1968 | Milster. |
| 3,385,637 | 5/1968 | Kersting. |

WILLIAM F. O'DEA, Primary Examiner

DAVID J. ZOBKIW, Assistant Examiner

U.S. Cl. X.R.

60—54.5; 137—512.2, 512.3